TAPE PLAYBACK SYSTEM

Filed May 28, 1958 3 Sheets-Sheet 1

INVENTORS.
DANIEL J. TORPY
RAYMOND J. STATTEL
BY [signature]
ATTYS.

INVENTORS.
DANIEL J. TORPY
BY RAYMOND J. STATTEL
ATTYS.

INVENTORS.
DANIEL J. TORPY
RAYMOND J. STATTEL
BY
ATTYS.

United States Patent Office 2,951,243

Patented Aug. 30, 1960

2,951,243

TAPE PLAYBACK SYSTEM

Daniel J. Torpy, Takoma Park, and Raymond J. Stattel, Hyattsville, Md., assignors to the United States of America as represented by the Secretary of the Navy Filed May 28, 1958, Ser. No. 738,582

6 Claims. (Cl. 340—174.1)

(Granted under Title 35, U.S. Code (1952), sec. 266)

The invention described herein may be manufactured and used by or for the Government of the United States of America without payment of any royalties thereon or therefor.

This invention relates generally to a tape playback system and is more particularly concerned with a magnetic tape playback system provided with circuitry to reduce the output noise to a fixed permissible level.

In the recording of data, the information may be recorded on a magnetic tape by frequency modulation of a carrier signal. Inherent in such a recording system is the disadvantage that any variation in the speed of the tape, during recording or playback, will effectively vary the frequency of the carrier and cause noise during playback. All such speed variations in the recording or playback instruments will be referred to as "wow" and "flutter," in this specification. These variations may be caused by any of several imperfections in the system such as, for example, out-of-round capstans or variations in the speed of the drive motor; it will not be necessary to distinguish herein between speed variations introduced in recording and in playback, or, between slow or fast variations.

Since the frequency modulation of the carrier by the "wow" and "flutter" is not pertinent to the information being recorded, it is desirable to remove its effects. By recording a fixed reference frequency simultaneously with a data signal on a different track of the recording tape, all the "wow" and "flutter" is displayed as variations in the frequency of this reference signal when the tape is played back. A compensation may then be introduced to electronically eliminate "wow" and "flutter."

It is one object of this invention to provide a magnetic tape playback system which eliminates objectionable "wow" and "flutter."

Another object is the provision of a magnetic tape playback system which may accurately read a large number of tape recorded signals.

A further object is the provision of an improved FM magnetic tape playback system which reduces "wow" and "flutter" to a fixed permissible level.

These and many other objects will be more readily apparent when the following specification is read and considered along with the attendant drawings wherein like numerals designate like or similar parts throughout the various views and in which.

Figure 4:
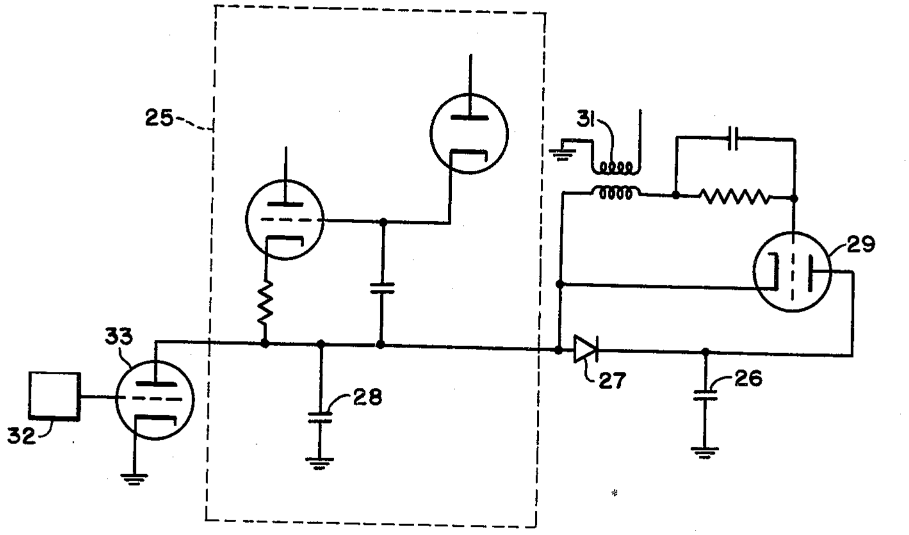
Figure 2:
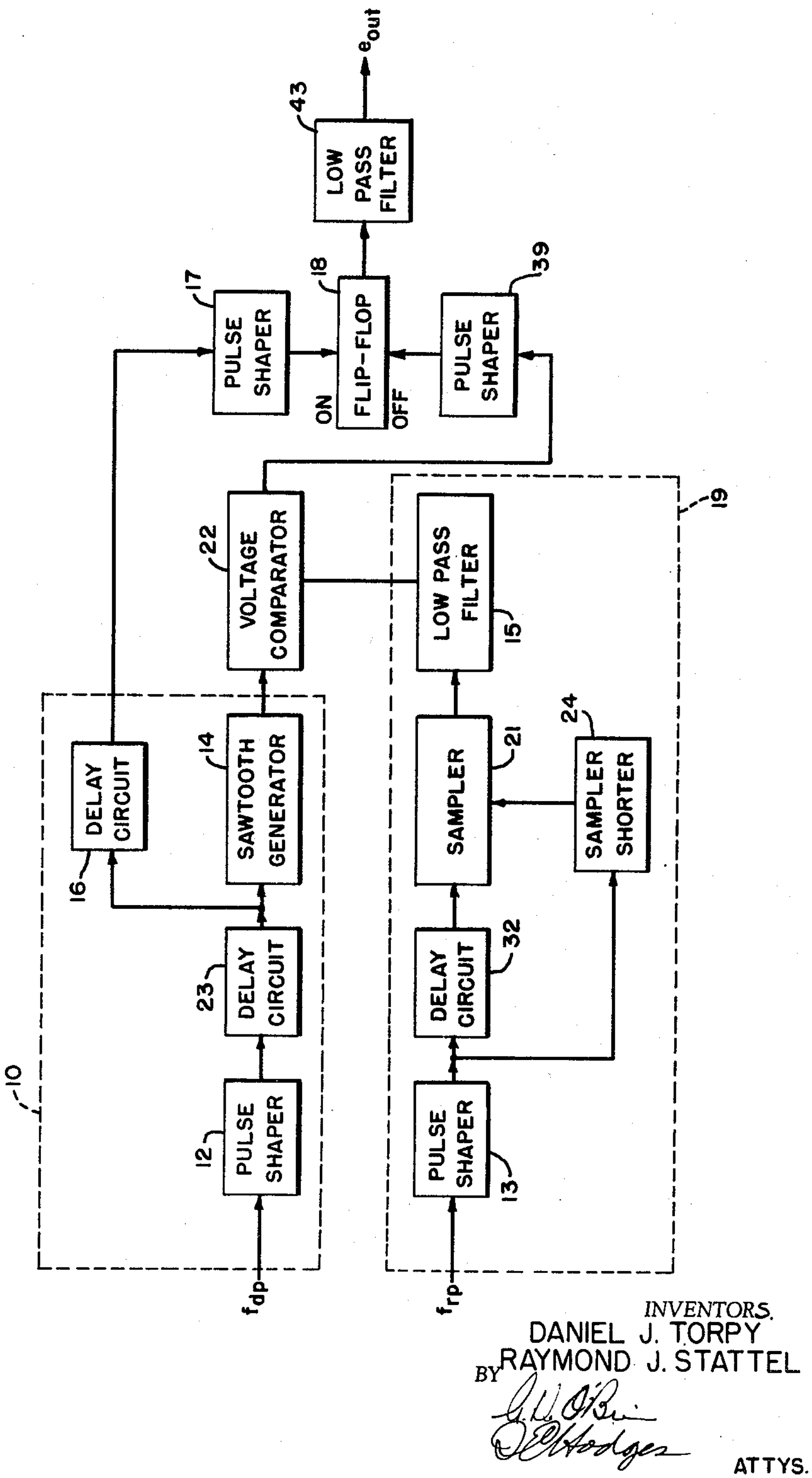
Fig. 2 is a block diagram of a system embodying the principles of this invention.

Figs. 3*a*–3*d* are diagrams showing waveforms at various portions of the system of Fig. 2;

Fig. 4 is a circuit diagram of the sampler of Fig. 2; and

Figure 5:
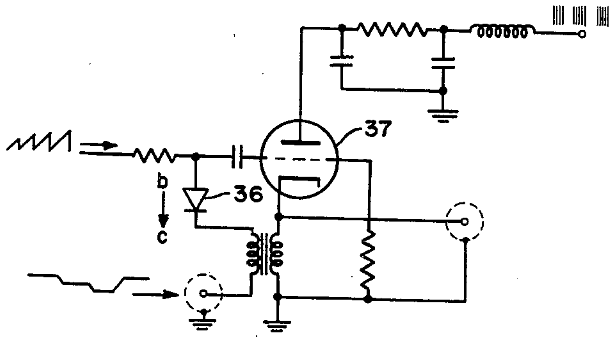

Fig. 5 is a circuit diagram of the comparator of Fig. 2.

In this specification the terms "data signal" and "reference signal" refer to the signals taken from the tape, or if so labeled, those fed to the recorder in the recording process. Subscripts will identify the signals; for example, $f_d$ indicates the frequency of the data signal fed to the recorder, while $f_{dp}$ represents the frequency of the data signal taken from the playback and $f_r$ and $f_{rp}$ indicate the corresponding reference signals. The term "data information" means the information contained as frequency modulation of the data carrier and "reference information" is "wow" and "flutter" of the reference carrier.

Figure 1:
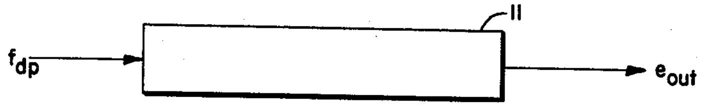
Fig. 1 is a block diagram of a typical uncompensated playback system.

In order to more fully appreciate this invention it is desirable to consider a typical uncompensated playback system such as shown in Fig. 1. The data signal is played back through a discriminator 11 which produces an output voltage, $e_{out}$, linearly proportional to the frequency, $f_{dp}$, of the input signal applied thereto. If the output for zero frequency input is not equal to zero, the output would always contain an additive constant so that:

$$e_{out}=Af_{dp}+C_1 \quad (1)$$

Where: $A$=discrimiantor gain; $f_{dp}$=frequency of data signal from playback; $C_1$=discriminator output for zero frequency input.

Since $$f_{dp} \text{ equals } x_d f_d = x_d(f_{do}+\Delta f_d)$$

$$e_{out}=AX_d(f_{do}+\Delta f_d)+C_1 \quad (2)$$

Where $f_d$=the frequency of data signal fed to the recorder; $f_{do}$=carrier component of $f_d$ (a constant); $\Delta f_d$=change in $f_d$ caused by data information and $x_d$=instantaneous ratio of $f_{dp}$ and $f_d$.

Now let $x_d=K_d+\Delta K_d$ where $K_d$=a constant equal to the fractional reduction of tape speed from record to playback, not including "wow" or "flutter." $\Delta k_d$=an instantaneous variable expressing the effects of "wow" and "flutter."

Substituting and expanding Equation 2 at this point $$e_{out}=(AK_d f_{do}+C_1)+(AK_d\Delta f_d)+(A\Delta K_d f_{do})+(A\Delta K_d\Delta f_d)$$

In this equation: $(AK_d f_{do}+C_1)$ equals a constant which can be removed by suitably biasing the discriminator output;

$(AK_d\Delta f_d)$ equals a constant time frequency deviation of the data signal and is proportional to the data information and is the output desired from the playback system;

$(A\Delta K_d f_{do})$ is a fixed amplitude signal independent of the magnitude of data information, it is an indication of the effect of "wow" and "flutter" on the data carrier frequency;

$(A\Delta k_d\Delta f_d)$ equals the result of "wow" and "flutter" acting on the data information; it is, for a particular level of "wow" and "flutter," a constant percentage of the data information.

The purpose of the instant invention is to remove the latter two components. This compensation system provides a D.C. output voltage by generating a train of blocks proportional to the instantaneous reference period divided by the data period:

$$e_{dc}=E\frac{K_3 t_r}{K_4 t_d} \quad (3)$$

$$t_r=\frac{1}{f_{rp}}$$

the period of the reference signal from the playback, and $$t_d=\frac{1}{f_{dp}}$$

i.e. the period of the data signal from the playback.

It can be seen that this D.C. output is a measure of the "wow" and "flutter" by assuming a derived output voltage, $$e_{out}=C_3\frac{f_{dp}}{f_{rp}}$$

where $C_3$ is a constant.

Since $$f_{dp}=(K+\Delta K)(f_{do}+\Delta f_d)$$

and $$f_{rp}=(K+\Delta K)f_{ro}$$

$$e_{out}=C_3\left(\frac{f_{do}+\Delta f_d}{f_{ro}}\right)$$

$f_{ro}$ is a constant being the frequency of the reference carrier fed into the recorder when the record is made, similarly $f_{do}$ is a constant.

Therefore $$e_{out}=K_1+K_2\Delta f_d$$

The constant $K_1$ may be removed by D.C. biasing of the output to give a signal proportional to $\Delta f_d$, the data information and having no "wow" and "flutter" components.

The system for accomplishing this, generates a series of voltage blocks whose widths are inversely proportional to $f_{rp}$ and the spacing between successive blocks is inversely proportional to $f_{dp}$. "Wow" and "flutter" cause both the width and the spacing of the blocks to vary. The data information further causes a variation in the block spacing since this spacing depends on $f_{dt}$. The variations in width and spacing occur slowly with respect to the fundamental frequency of the blocks, so that the train of blocks may be thought of as a slowly changing periodic function. Its Fourier spectrum at any moment, then, consists of harmonically related sinusoids plus a slowly changing D.C. level. The average or D.C. level of the blocks is:

$$e_{do}=E\left(\frac{K_3t_r}{K_4t_r}\right) \quad (4)$$

where $E$=the height of the block in volts; $k_3$ and $k_4$ are constants. By passing this output through a low pass filter which eliminates everything but the D.C. level, the desired output is arrived at.

A block diagram of a circuit embodying the principles of this invention is shown in Fig. 2. Reference and data signals are introduced into pulse shapers 12 and 13 respectively, each of which generates short pulses at each positive going crossover of the signal pulses. Thus the frequencies of the pulses generated are the same as those of the reference and data signals $f_{rp}$ and $f_{dp}$ from the tape. The data pulses drive a constant ramp sawtooth generator 14; each time a pulse occurs, it resets the sawtooth voltage which then rises at a constant rate until the next data pulse occurs. As each data pulse is received it is fed through a delay circuit 16 to a pulse shaper 17 and turns "on" a flip flop circuit 18 for the purposes described hereinafter.

In the reference channel 19 pulses from the shaper 13 serve to operate a sampler 21 which measures the period $$t_r=\frac{1}{f_{rp}}$$

of the reference pulse during each cycle. During the next succeeding cycle, the output voltage of sampler 21 is proportional to the length of the period measured during the preceding cycle. Accordingly, the output voltage of sampler 21 is a step function of amplitude during any period proportional to the length of the preceding period. This output is passed through filter 15 and together with the sawtooth voltage from data channel 10 is fed to a voltage comparator 22 which begins to oscillate when the sawtooth voltage becomes as high as sampler voltage. The first cycle of the oscillation turns off flip flop 18 and prepares it for the next pulse, flip flop unit 18 is turned "on" by the data sawtooth once during each data period and remains "on" for the length of time required for the sawtooth voltage to rise to the level of the sampler voltage. Since the sawtooth rises at a constant rate and the sampler voltage is proportional to the period $t_r$, this time will be proportional to $t_r$. Thus, the voltage blocks generated by flip flop unit 18 have the desired width and spacing in the typical wave form shown in Fig. 3*d*.

If, for any reason, the speed of playback decreases, the frequencies of both the data and reference signals from the tape decrease and their periods increase. The sampler output voltage jumps higher each cycle causing the comparator 22 to commence oscillation later during the cycle. Consequently, the blocks generated by the flip flop unit spread apart and become wider in such a manner as to keep the D.C. level of the flip flop output unchanged. If only the data signal frequency were to change, the spacing only of the blocks would change and the D.C. level would vary in accordance with the data information to produce the desired output signal.

In order to eleminate erratic operations of flip flop 18 due to its failure to turn on consistently at the beginning of each data sawtooth because of the simultaneous occurrence of the "off" input (comparator oscillations) and the "on" input (data pulse) to flip flop 18, a delay 23 is incorporated into the circuitry to introduce a constant duration delay to reduce the width of the blocks generated by flip flop 18 by a constant amount.

The reason delay unit 16 is included into the data channel is related to the fact that the level of sampler voltage during any reference period is proportional to the length of the preceding period. Thus, the information represented by sampler voltage is at all times delayed, the amount of delay at any time $t$ being equal to the length of time since the reference period was equal to the value represented by the sampler voltage at the time $t$. The function of delay 16 is to cancel the effects of the delay introduced into the reference signal by sampler 21.

In order to more fully appreciate the function of the sampler 21 and shorter 24, reference may now be had to Figs. 3 and 4. The sawtooth generator 25 is driven by reference pulses from shaper 13 to produce a sawtooth wave 44 having a constant ramp or slope so that if the frequency $f_{rp}$ of the incoming signal does not vary, the amplitude of the sawtooth generated is constant. If $f_{rp}$ decreases, increasing the period of the pulses, the amplitude of the sawtooth increases. Conversely an increase in $f_{rp}$ results in a decrease in the amplitude of the sawtooth.

The sawtooth voltage builds up in a linear fashion and is impressed upon a capacitor 26 through the diode 27; a capacitor 28 is also charged to the instantaneous voltage of the sawtooth. As the sawtooth voltage drops to ground, the voltage on capacitor 28 follows it down. However, diode 27 does not conduct in a direction to permit discharging of capacitor 26, accordingly, it remains charged to the peak value of the sawtooth voltage. If $f_{rp}$ decreases so that the amplitude of the succeeding sawtooth increases, capacitor 26 is charged up to a new value as the sawtooth voltage increases.

On the other hand, if $f_{rp}$ were increasing so that the period and consequently the amplitude of the succeeding peaks of sawtooth 39 is decreased, capacitor 26 would remain at the higher peak value of the sawtooth and would not follow the successive peaks down.

In order to avoid this difficulty a triode 29 is shunted across diode 27. Triode 29 conducts in a direction opposite from diode 27 to permit capacitor 26 to discharge when the triode is rendered conductive by a positive pulse applied to its grid. This "triggering" pulse supplied by the reference signal is impressed directly on the primary of transformer 31. Since the reference signal sent to triode 29 is not delayed by a delay circuit 32 (Fig. 2) as is the pulse fed to the grid of a sawtooth input triode 33, capacitor 26 is discharged shortly before the sawtooth builds up to its peak value. The voltage on the capacitor therefore is shorted down to a value equal to the instantaneous sawtooth voltage at a time slightly ahead of its peak and rides up to the new lower peak. A trace of the voltage on capacitor 26 is a step function 34 as shown in Fig. 3*a*, having a value at any time equal to the preceding period of reference signals.

Figures 3A, 3B, 3C, 3D:
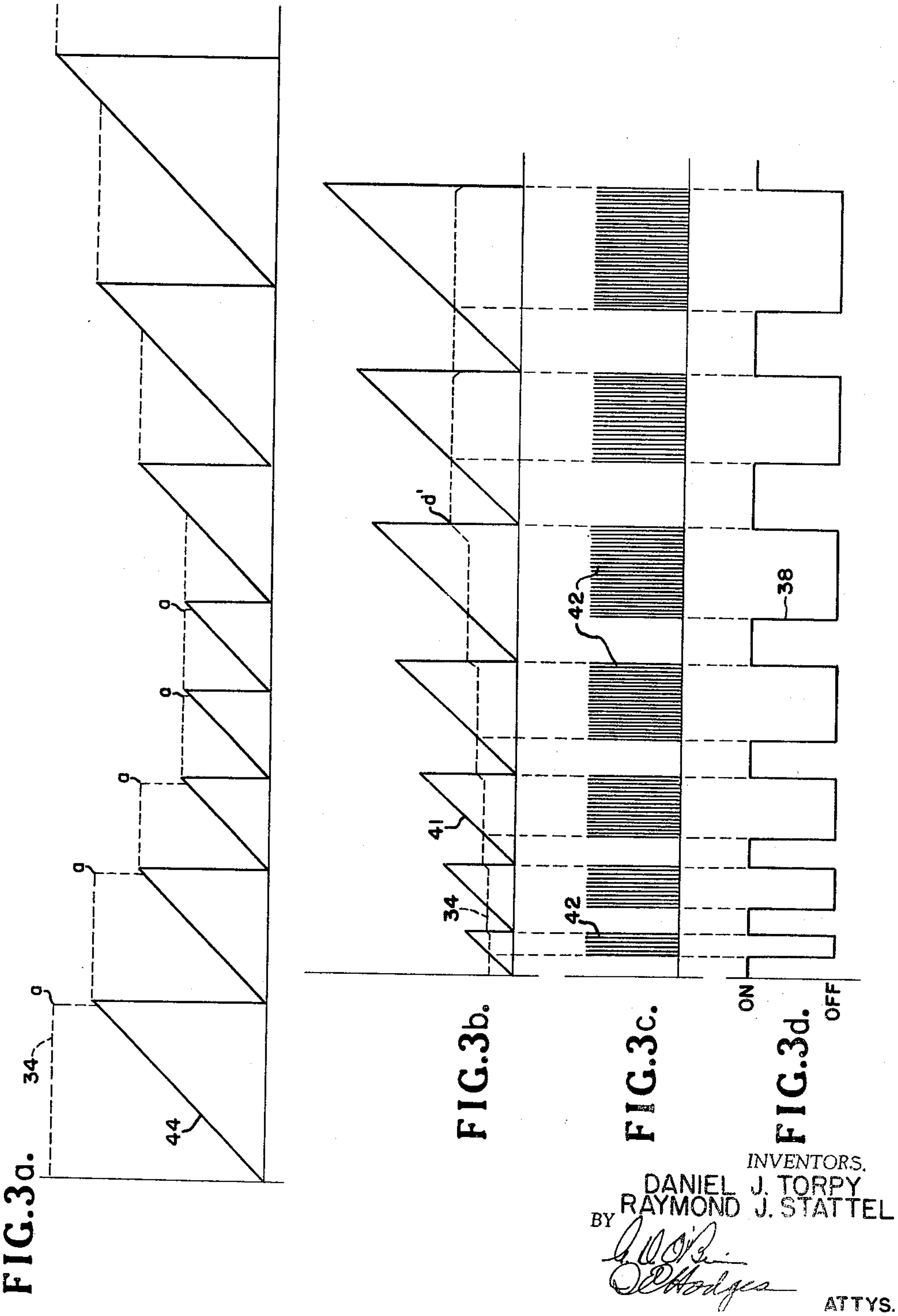

The voltage trace shown in Fig. 3*a* indicates a reference signal having at first an increasing frequency, then a steady frequency which finally decreases. On this curve, point "*a*" indicates the time at which the triode 29 shorts capacitor 26 down to sawtooth voltage 44.

The data pulses are fed into the data channel to trigger sawtooth generator 14 to produce a constant rate sawtooth 41 having the same period as the period of the data pulses. The slope of the data sawtooth is steeper than that of the reference frequency however.

The step voltage from the reference channel and the data sawtooth are fed into a voltage comparator 22 which commences oscillations 42 (Fig. 3*c*) when the data sawtooth voltage becomes as high as the sampler voltage. As shown in Fig. 5 the circuit for accomplishing this is basically an oscillator normally cut off by the diode 36 which represents a very high resistance to current flow as long as the signal from the reference channel exceeds that of the data channel. But after the two voltages are equalized, the resistance of the diode becomes low enough to permit oscillation of the triode 37 as diode 36 conducts in a direct *b*—*c* whereupon triode 37 goes into oscillation.

The output from the comparator circuit and the data pulses are introduced via shaper 39 into flip flop 18 which produces a series of blocks 38 (Fig. 3*d*). The first pulse of the oscillation of comparator 22 turns "off" flip flop 18 and the start of the data pulse turns it "on."

Therefore if the frequency of the incoming data signal changes due to the receipt of an information pulse by the recorder, flip flop 18 will produce more or less blocks in its output according to whether $f_d$ is increasing or decreasing. In the event that both the data frequency and the reference frequency decrease, less blocks will be generated per unit time and the width of the block will increase to compensate for the decrease in number of blocks so that the overall area of the blocks remains constant. Therefore the output signal after passing through a filter 43 is a constant D.C. level unaffected by "wow" "flutter."

Fig. 3*b* may now be referred to in order to more fully appreciate the wave form of the voltages described in the foregoing description of the comparator and flip flop circuits.

As shown in Fig. 3*b* the data sawtooth is first increasing because of "wow" and "flutter," at point "*d*" the "wow" and "flutter" disappears and the sawtooth continues to increase because of incoming data information. It is apparent from this figure that although the interval between the data sawtooth begins and the time it equals the reference sampler increases, the interval between the time the data sawtooth and the reference sampler voltage are equal and the time the sawtooth shorts to ground also increases. Therefore the average D.C. output from the flip flop remains constant. When the data sawtooth increases because of the receipt of a data signal, the "on time" of the flip flop remains constant while the block spacing increases but the average D.C. output changes to provide an information signal from the system.

The effectiveness of the system in eliminating wow-and-flutter variations was determined by playing typical recordings of pressure signals through the system and also by simulating wow-and-flutter variations by feeding both channels with a frequency-modulator. The latter method was used to simulate wow-and-flutter variations of greater amplitude than those obtained from the tape recordings. The signals from the tape recordings contained wow-and-flutter variations which were about 12 percent of the carrier frequencies. These variations consisted mostly of a 2 c.p.s. component and a 30 c.p.s. component, plus a small random component. The compensation reduced the corresponding variations in the output voltage to 1/10 of their uncompensated value, or to approximately 1% of the voltage corresponding to the carrier frequency. It should be noted, however, that the compensation appeared to remove the wow-and-flutter variations completely; the small amount of noise that was left was 60 c.p.s. and 120 c.p.s., which was coming from the power supplies and from pickup of 60 c.p.s. fields in the room. This noise could have been reduced to a value equivalent to less than 1% wow-and-flutter, but it was not considered necessary to do so in this case.

The simulated wow-and-flutter of larger amplitudes than 12% was created by varying the frequency of the output of the frequency-modulator feeding both reference and data channels. Using this method, it was determined that wow-and-flutter variations much larger than 12% caused no increase in the compensated-output noise. The maximum possible variations were equivalent to wow-and-flutter variations of 25%. Such a situation would rarely occur in practice, but this shows that the wow-and-flutter variations could be quite large without any increase in the output noise caused by them.

These results of the wow-and-flutter reduction can be summarized as follows:

Input to system: Signals from tape recordings
Percent wow-and-flutter: 12%
Frequency components in *w* and *f* (wow and flutter): Primarily 2 and 30 c.p.s.; much smaller random components
Uncompensated output: 400 millivolts peak-to-peak
Compensated output: 40 millivolts peak-to-peak
Reduction: 10:1

Input to system: Signal from frequency-modulator with simulated *w* and *f*; frequency varied sinusoidally at rates up to 30 c.p.s.
Percent wow-and-flutter: 25%
Uncompensated output: 825 millivolts peak-to-peak
Compensated output: 40 millivolts peak-to-peak
Reduction: 21:1

It must be stressed that the significant feature is not the reduction ratio, but the fact that the output noise is reduced to a fixed level, which, in this case, happens to be 40 millivolts.

Theoretically the system will eliminate all the wow-and-flutter variations, and that, practically, the same result has been achieved, within a limit imposed by a small amount of other noise in the output which is equivalent to about 1% wow-and-flutter. This noise could be reduced further by employing more expensive components but this was not considered worthwhile doing for the present application of the system.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An F.M. tape playback system having a first channel provided with an input for receiving a data signal modulated by wow and flutter and an intelligence signal, and a second channel having an input for receiving a reference signal modulated by wow and flutter only, said first channel including means for generating a sawtooth voltage having peaks proportional to the period of the data signal, said second channel including means for generating a step voltage proportional to the length of the preceding period of the reference signal, a flip flop circuit producing an output signal in the form of a series of voltage blocks, a comparator circuit operatively connected to said first and second channels to receive the data sawtooth and the reference step voltage and connected to said flip flop for turning it "off" when the sawtooth voltage exceeds the step voltage, means connecting said first channel to said flip flop whereby each pulse of the data signal turns said flip flop "on," a filter network connected to the output of said flip flop to convert the flip flop output into a D.C. voltage thereby providing a D.C. output having a constant value when the reference and data signals are modulated only by wow-and-flutter and having a varying value indicative of the intelligence signal when the data signal is modulated by the intelligence signal.

2. The playback system of claim 1 wherein the means for generating a step voltage comprises a sawtooth generator producing a constant slope sawtooth voltage, which is reset each time said constant slope generator receives a pulse of a predetermined going crossover polarity from the reference signal, a unidirectional current device connected to the output of said constant slope sawtooth generator to permit current flow away from the generator only, voltage storage means connected in series with said device thereby to receive and store the peak voltage of the sawtooth and without being grounded as the generator resets, thereby retaining a voltage equal to the previous peak of the sawtooth after said constant slope sawtooth generator is reset.

3. The playback system of claim 2 further including a delay circuit in said second channel to delay the receipt of the reference pulse by said constant slope sawtooth generator a preselected amount, a triode shunted across said unidirectional current device and having a grid connected to said second channel input ahead of said delay circuit to receive an undelayed reference pulse and ground said voltage storage means to the potential of the rising sawtooth at a time immediately prior to the sawtooth peak thereby to allow said storage means to assume the peak voltage of the sawtooth in the event it is lower than the preceding peak.

4. The system of claim 3 wherein the comparator circuit comprises an oscillator having a first input receiving the output from said first channel and a second input receiving the output from said second channel, a blocking diode shunted between said inputs of the oscillatory circuit to prevent oscillation when the data output exceeds the reference output and to permit oscillation when the reference output exceeds the data chanel output.

5. The system of claim 1 wherein said comparator circuit is an oscillator connected to said flip flop to turn it "off" when it begins to oscillate, said oscillator receiving step and sawtooth inputs from the reference data channels respectively and including a diode shunted between said inputs to permit oscillation only when the reference voltage exceeds the sawtooth voltage.

6. A system for the elimination of wow and flutter in an f.m. dual track tape playback system having a constant frequency reference signal recorded on one track and a data signal recorded on the other track of the tape which comprises; a reference channel and a data channel for processing the recorded reference signal and data signal respectively, said reference channel including an input, a delay circuit connected to said input, a sawtooth generator serially connected to the delay circuit producing a constant ramp sawtooth voltage and reset by the occurrence of a reference pulse of a predetermined going polarity, a capacitor connected to the output of said sawtooth generator and to be charged up to the peak voltage of the sawtooth, a clamping diode connected between said capacitor and said sawtooth generator to prevent resetting of the voltage on said capacitor as said sawtooth is reset, a triode shunted across said diode and having a grid connected to the input of said reference channel to receive reference pulses for rendering said triode conducting thereby permitting the capacitor to assume the value of the sawtooth before it peaks and to follow it up to a new peak to produce a step function voltage, said data channel including a pulse shaper for converting the data signal into a series of data pulses, a second sawtooth generator connected to said shaper and operable by said data pulses to produce a sawtooth voltage inversely proportional to the frequency of the data pulse, a triode oscillator having a first input to its grid from the reference chanel and a second input from the data channel, a diode connected between said inputs preventing oscillation of the oscillator until said data sawtooth exceeds step voltage a flip flop circuit connected to said data channel input ahead of said second sawtooth and to said oscillator and operable by the oscillations thereof, to produce a series of voltage block outputs unaffected by wow and flutter.

References Cited in the file of this patent

UNITED STATES PATENTS

| | | |
|---|---|---|
| 2,364,723 | Kellogg | Dec. 12, 1944 |
| 2,668,283 | Mullin | Feb. 2, 1954 |
| 2,685,079 | Hoeppner | July 27, 1954 |
| 2,713,677 | Scott et al. | July 19, 1955 |
| 2,771,596 | Bellamy | Nov. 26, 1956 |
| 2,807,797 | Shoemaker | Sept. 24, 1957 |
| 2,840,800 | Chester | June 24, 1958 |